(12) United States Patent
Ferrari et al.

(10) Patent No.: US 7,150,291 B2
(45) Date of Patent: Dec. 19, 2006

(54) FLUID ATTACHMENT FOR THE ACTIVATION AND DEACTIVATION OF FLUID DRIVEN DYNAMIC DEVICES

(76) Inventors: Gino Ferrari, Via Dario Ascari 8, 42015 Correggio (IT); Franco Maioli, Via Monache 2, 42015 Correggio (IT)

( * ) Notice: Subject to any disclaimer, the term of this patent is extended or adjusted under 35 U.S.C. 154(b) by 216 days.

(21) Appl. No.: 10/622,670

(22) Filed: Jul. 18, 2003

(65) Prior Publication Data

US 2004/0016462 A1 Jan. 29, 2004

(30) Foreign Application Priority Data

Jul. 19, 2002 (IT) .................... MO2002A0207

(51) Int. Cl.
*F16L 17/00* (2006.01)
*F15B 13/044* (2006.01)

(52) U.S. Cl. .............. 137/580; 137/596.18; 137/596.2

(58) Field of Classification Search ................ 137/580, 137/596, 596.18, 596.2
See application file for complete search history.

(56) References Cited

U.S. PATENT DOCUMENTS

| 933,290 | A | * | 9/1909 | Clay | 137/580 |
|---|---|---|---|---|---|
| 2,362,339 | A | * | 11/1944 | Armington | 137/596.18 |
| 3,140,102 | A | | 7/1964 | Johnson | |
| 3,596,567 | A | * | 8/1971 | Benjamin et al. | 137/596.18 |
| 3,873,061 | A | * | 3/1975 | Thylefors | 137/580 |
| 4,726,397 | A | * | 2/1988 | Stich | 137/580 |
| 4,976,282 | A | * | 12/1990 | Kubala | 137/580 |
| 5,439,029 | A | * | 8/1995 | Becker | 137/580 |
| 5,462,084 | A | | 10/1995 | Arisato | |
| 5,707,186 | A | * | 1/1998 | Gobell et al. | 137/580 |
| 6,386,221 | B1 | * | 5/2002 | Knoll et al. | 137/580 |

FOREIGN PATENT DOCUMENTS

EP 0 365 189 10/1989

* cited by examiner

*Primary Examiner*—John Rivell
(74) *Attorney, Agent, or Firm*—Collard & Roe, P.C.

(57) ABSTRACT

Apparatus comprising a normally closed valve element that can be mounted on a mobile part and fluid distributor means that can be mounted on a stationary part and is operatively connectable with said valve element.

8 Claims, 2 Drawing Sheets

FLUID ATTACHMENT FOR THE ACTIVATION AND DEACTIVATION OF FLUID DRIVEN DYNAMIC DEVICES

CROSS REFERENCE TO RELATED APPLICATIONS

Applicant claims priority under 35 U.S.C. §119 of Italian Application No. MO2002A000207 filed Jul. 19, 2002.

The invention relates to a snap coupling for activating and deactivating fluid-operated devices. For this purpose are generally used devices powered by fluids, such as pressurized air.

Those devices comprising stationary elements and mobile elements are subjected to drawbacks such as air leakage, particularly when rotational movement of the elements is involved, which occurs in rotating connection joints.

A further drawback consists in that, such rotating connection joints are provided with couplings having unbalanced elements which—in use—induce mechanical wear of the joints.

Such drawbacks are unacceptable when the devices powered with fluids are used to make precision dynamic measurements, which are required in wheel balancing machines, i.e. machines used to balance vehicle wheels.

The wheel balancing machines are provided with a balancing shaft, on which a wheel to be tested is mounted, said balancing shaft being fitted with a wheel-locking device that is activated and deactivated by means of compressed air.

The balancing shaft comprises two telescopic portions, i.e. a stationary portion that is mounted on a frame, and a mobile portion that is axially mobile relative to the stationary portion.

On the mobile portion, a stop member is mounted which is movable between a first position in which the wheel is blocked against a flange which is provided on the stationary portion and a second position in which the stop member is distanced apart from the wheel.

Movement of the stop member between the first and the second position, and vice versa, is operated by corresponding movements of the mobile portion which is driven by pneumatic means mounted therein comprising a rotating joint and a distributor through which compressed air introduced into the pneumatic means.

The connection between the distributor, which is stationary, and the mobile section of the rotating balancing shaft is affected by the above-described drawbacks.

In particular, the presence of the rotating joint interferes with the balancing operations.

An object of the invention is to overcome the above-mentioned drawbacks.

Another object of the invention is to develop a device that makes it possible to activate and deactivate fluid-dynamic devices without incurring in drawbacks involving leakage of air seal and unsuccessful balance.

According to the invention, there is provided an apparatus, comprising a normally-closed valve element that can be mounted on a mobile member and fluid distributor means that can be mounted on a stationary part and is operatively connectable with said valve element.

In one embodiment, the normally closed valve element is mounted on a mobile portion of a balancing shaft of a wheel-balancing machine and the fluid distributor means is mounted on a stationary element of a frame body of said wheel-balancing machine.

Owing to the invention, rotating connection joints are no longer necessary to operate the mobile portion of a balancing shaft.

The invention will be better understood and put into practice with reference to the drawings attached, showing one exemplifying embodiment of the invention, in which.

Figure 1:
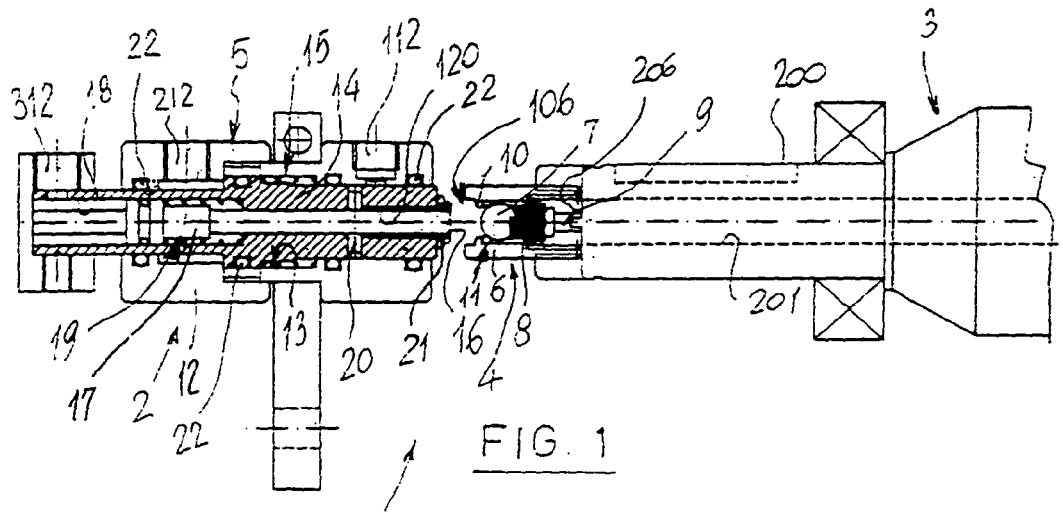
FIG. 1 is a longitudinal cross-section of a first version of a snap coupling, in a position showing a disconnected configuration.
Figure 2:
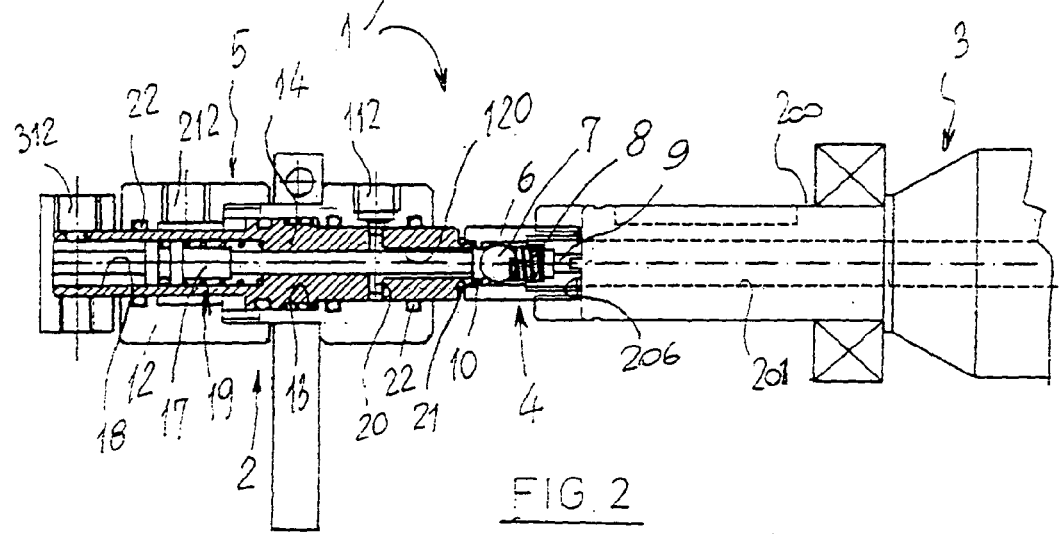
FIG. 2 is a longitudinal cross-section of the snap coupling as per this invention, in a position for activating the locking device.
Figure 3:
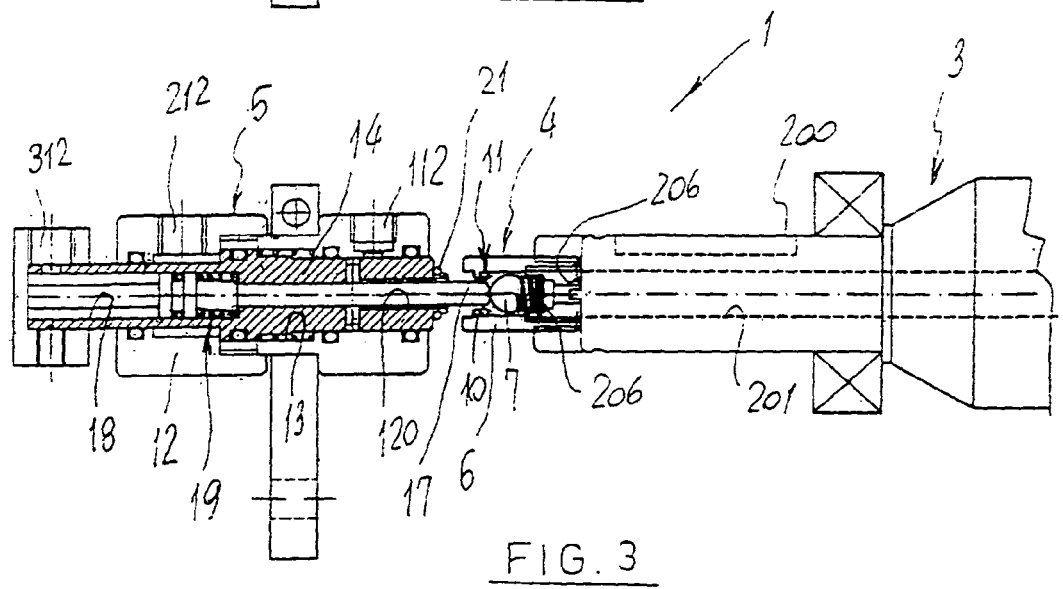
FIG. 3 is a longitudinal cross-section of the snap coupling as per this invention, in a position of deactivation of the locking device.
Figure 4:
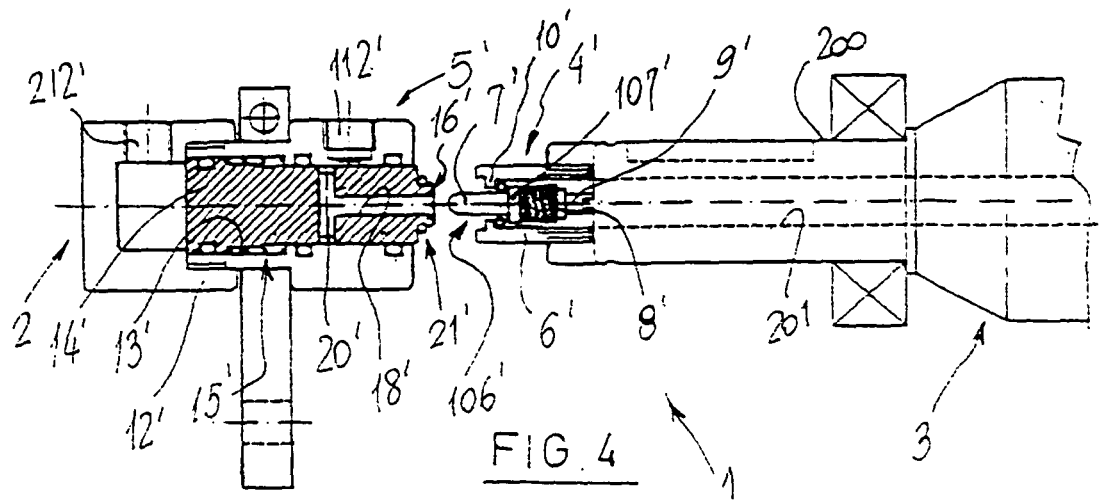
Figure 5:
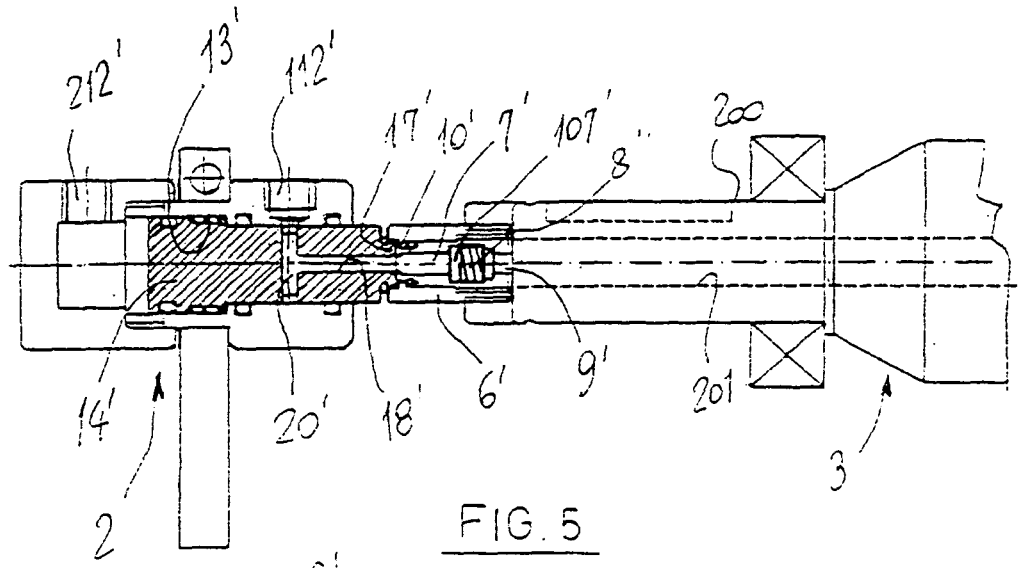
Figure 6:
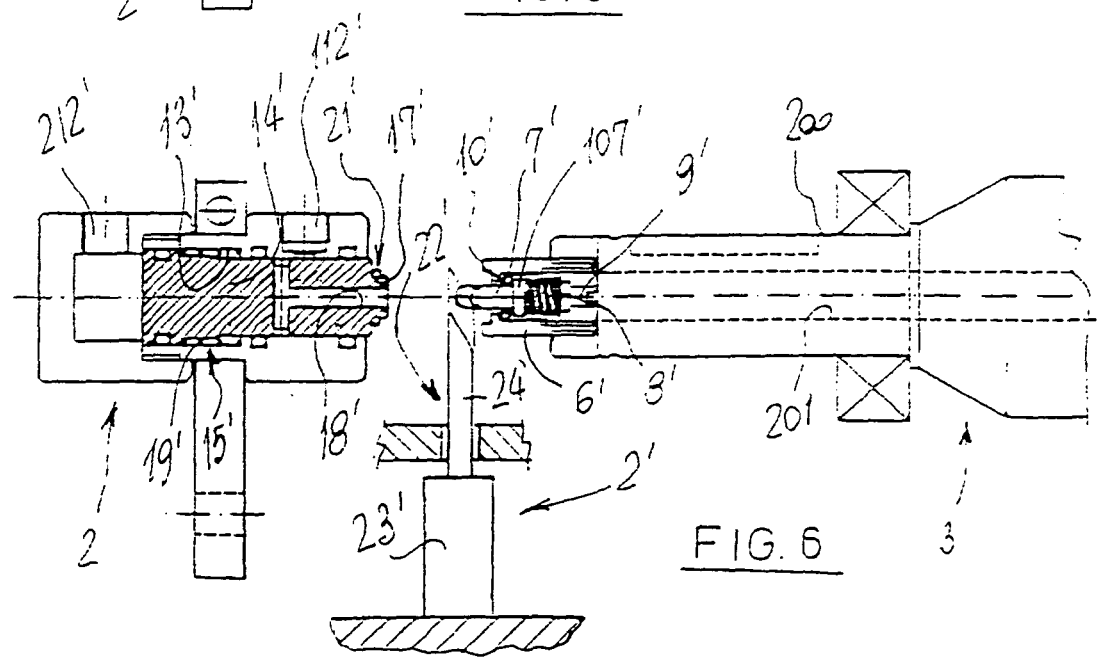

FIGS. 4, 5, and 6 illustrate a second version of the snap coupling as per this invention in the positions shown respectively in FIGS. 1, 2, and 3.

With particular reference to the above-mentioned Figures, the number 1 indicates a snap coupling apparatus that can be used for the activation or deactivation of devices being generally fluid-dynamic operated. The snap coupling apparatus comprises a stationary part 2 suitable for supplying the fluid and a mobile part 3 which uses said fluid for its functional operation.

The mobile part 3 of the snap coupling apparatus 1 comprises a balancing shaft 3.

In a first embodiment, the snap coupling apparatus 1 comprises a valve element 4, normally closed, which can be rigidly mounted on the mobile part 3 of the snap coupling apparatus 1, and a corresponding stationary distributor 5 for distributing the fluid which is mounted on the stationary part 2 of the snap coupling apparatus 1. The stationary distributor 5 can be coupled with the valve element 4 for the activation of the snap coupling apparatus 1 and be uncoupled from the valve element 4 for the deactivation of said snap coupling apparatus 1.

The valve element 4 comprises a body 6 that is essentially bell-shaped and provided with an opening 106 and a bottom part 206, and elastic means 8 comprising a reactive helical compression spring which is placed between a closing element 7 and the bottom part 206.

The elastic means 8 are suitable for contrasting the motion of the closing element 7 into the valve element 4.

The opening 106 allows the fluid to flow from the distributor means 5 into the valve element 4 and it can be closed with the closing element 7, which is preferably spherical. The elastic means 8 is suitable for maintaining the closing element 7 in its normal configuration in which the opening 106 is closed.

The valve element 4 further comprises a pipe 9, passing through the bottom part 206 of the body 6 and suitable for connecting the latest with the fluid-dynamic operated device, a collar 10 internally protruding from the opening 106 in radial direction and suitable for stopping and limiting the closing element 7, and seal means 11 interposed between the closing element 7 and the collar 10 and suitable for assuring the sealing of the body 6 in its closed position, so as any fluid can not flow into the body 6.

The stationary distributor 5 comprises a casing 12 for containing the stationary distributor 5, which is provided with three fluid inlets placed in order and preferably transversally, a first fluid inlet 112, a second fluid inlet 212, and a third fluid inlet 312.

The casing 12 is also provided with a chamber 13, axially positioned into the casing 12, in which can axially slides a slider 14, the slider 14 is contrasted in its sliding movement by first elastic means 15 interposed between the chamber 13 and the slider 14.

The slider 14 is provided with a front outlet 16 allowing the passage of the fluid directed toward the valve element 4, a seat 18, coaxial with respect to the slider 14, in which a stem element 17 can slide, and second elastic means 19 interposed between the stem element 17 and the seat 18.

The stem element 17 can be axially moved forward and backward into the seat 18 so as to be moved toward the frontal opening 16 in the activation phase of the fluid-dynamic devices and respectively to be removed from the frontal opening 16 in the deactivation phase of the fluid-dynamic devices, as is described in greater detail below.

The stem element 17 is contrasted in its movement by the second elastic means 19.

The first elastic means 15 and the second elastic means 19 comprise a helical compression spring which is coiled respectively externally at the slider 14 and around the stem element 17.

On the slider 14 is transversally obtained an inlet 20 having an annular configuration, which in consequence of the movement of slider 14, can be alternatively put in correspondence with one of the three fluid inlets.

In particular, the inlet 20 can be put in correspondence with the first fluid inlet 112, and it can be also connected with the front opening 16 by means of a pipe section 120 obtained in the slider 14 externally to the stem element 17 and extending coaxially with the stem element 17.

The first fluid inlet 112 and the second fluid inlet 212 are arranged for allowing the inlet of the fluid used to activate the fluid-dynamic devices and can be substantially simultaneously feed, whereas to the third fluid inlet 312, which can be feed alternatively to first fluid inlet 112 and to the second fluid 212, can be supplied the fluid to be used to deactivate the fluid-dynamic devices.

On the perimeter of the front outlet 16 are provided further seal means 21 that can be placed in contact with the abutting and limiting collar 10 when the stationary distributor 5 is coupled with the valve element 4.

Annular seal means 22 are provided between the chamber 13 and the slider 14 and also between the seat 18 and the stem element 17, these annular seal means 22 comprises, for example, a gasket made of elastic material, usually named as "O-ring".

In a second embodiment, a snap coupling apparatus 1' comprises, as in the first embodiment, a stationary part 2, a valve element 4, normally closed, which can be rigidly mounted on a mobile part 3' of the snap coupling apparatus 1', and at least a stationary distributor 5' for distributing the fluids.

The stationary distributor 5' can be coupled with or uncoupled from the valve element 4' for opening its supply link and activating said fluid-dynamic device.

The valve element 4' comprises a body 6' that is essentially bell-shaped and provided with an opening 106' for allowing the inlet of the fluid into the valve element 4' and with a bottom part 206'. The opening 106' can be closed with at least a stem element 7' provided with an enlarged head 107'.

Between the bottom part 206' of the body 6' and the enlarged head 107' of the stem element 7' are interposed elastic means 8' suitable for maintaining the stem element 7' in its normal configuration in which the opening 106' is closed by the enlarged head 107'.

On the bottom part 206' of the body 6', is provided a pipe 9' that orthogonally passes through the bottom part 206' so as to connect the valve element 4' with a fluid-dynamic device.

The opening 106' is internally provided with an abutting and limiting collar 10' that radially protrudes from the opening 106'.

Between the collar element 10' and the enlarged head 107' are provided seal means 11', being preferably annular-shaped.

A casing 12' is externally provided to the stationary distributor 5', the casing comprises at least two essentially fluid inlets placed in order, preferably transversal, comprising a first fluid inlet 112' and a second fluid inlet 212'.

The casing 12' is so configured as to seal the stationary distributor 5', and it is provided with a chamber 13', into which is mounted a slider 14 so arranged as to slide into the chamber 13'. Between the chamber 13' and the slider 14' elastic means 15' are provided, suitable for contrasting the sliding motion of the slider 14' into the chamber 13'.

The slider 14' is provided with a front outlet 16' for allowing the outlet of a fluid and a rod 17' for sealed coupling the slider 14' with the valve element 4', or more precisely, with its opening 106'.

The slider 14' comprises a pipe section 18' coaxial with the slider 14', which is connected to the front outlet 16' and in which the fluid flows, and, peripherally, a peripheral transverse inlet 20', preferably in the shape of an external groove, which can alternatively be coupled with one of the two fluid inlets, particularly with the first fluid inlet 112', and which can be connected to the coaxial pipe section 18'.

The front outlet 16' is perimetrically provided with further sealing elements 21', which are usually of the type known as "O-rings", and which can be placed in contact with the collar 10'.

In the preferred embodiment the elastic means 15' comprises at least a helical spring 19', which can be loaded by compression and which is interposed between the slider 14' and chamber 13' in which the slider 14' slides.

The helical spring 19' can be replaced, for example, with a double-acting actuator connected to the slider 14' in a manner that is well-known persons skilled in the art.

The snap coupling apparatus 1' comprises also a deactivation element 2' comprising a thrust element 22' that by contact thrusts the stem element 7' so as to re-insert the stem element 7' into the body 6', and an alternate motion actuator 23' having a reciprocating motion which is per se known and suitable for moving the thrust element 22'.

The thrust element 22' is essentially transversal with respect to the stem element 7' and can comprise a wedge-shaped body 24' integrally mounted on the actuator 23' and so oriented as to have at least one oblique face turned toward the stem element 7' in order to maintain the sliding condition between the stem element 7' and the actuator 23'.

The functioning of the snap coupling apparatus 1 is described below for both of the possible embodiments, and it is referred, by way of example only, to the possible use on a wheel-balancing machine. Reference will be in particular made to the activation or deactivation of the usually device used for locking the wheels on a balancing shaft 3 of a generic balancing machine.

The balancing shaft 3 is provided with a rear protrusion 200 inside which is provided an axial channel 201 into which flows the pipe 9.

In the first embodiment of the snap coupling apparatus 1, the valve element 4 is mounted on one end of the rear protrusion 200, whereas the stationary distributor 5 is integrally attached to the frame of a balancing machine, in a manner known to a person skilled in the art, so as the stationary distributor 5 faces and is coaxially aligned with, the valve element 4.

When it is necessary to activate the locking device for locking a wheel on a balancing shaft of the balancing machine, the locking device being operated by compressed air, the compressed air is simultaneously supplied through the first fluid inlet 112 and through the second fluid inlet 212.

At the beginning, in the deactivation configuration, the snap coupling apparatus 1 is in the configuration shown in the FIG. 1, in which the slider 14 is so positioned into the casing 12, as the inlet 20 is uncoupled with the first fluid inlet 112, therefore, the compressed air flows into the second fluid inlet 212.

The compressed air expands into the chamber 13 thus pressing on the slider 14, so as to make it to slide into the chamber 13 until a portion of the slider 14 externally protrudes from the casing 12, and an end portion of the slider 14 abuts against the collar 10. In this way, an end portion of the slider 14 and the frontal opening 16 are coupled with the valve element 4.

Therefore, the end portion of the slider 14 press onto the closing element 7 that, after have overcoming the resistance of the elastic means 8, moves toward the inside of the body 6 so opening the opening 106.

Owing to the configuration of the slider 14 and of the valve element 4 and, most of all, owing to the presence of the annular seal means 22 and of the seal means 11, a seal coupling is obtained between the slider 14 and the valve element 4.

The sliding of the slider 14 into the chamber 13 causes the inlet 20 to correspond with the first fluid inlet 112.

In consequence of this, the compressed air flows into the pipe section 120 and then, through the frontal opening 16 and the valve element 4, which are seal-joined together, and through the axial channel 201, reaches the wheel-locking device that is then activated.

The compressed air generates into the activated locking device and in the axial channel 201 a pressure acting on the closing element 7.

The spring means 8 that are in the loaded configuration tends to extend, so exerting a force on the closing element 7 in the same direction of the pressure exerted by the compressed air.

Thus the closing element 7 is made to return in its first position, so closing the opening 106 again. Contemporaneously, is interrupted the supply of compressed air to the stationary distributor 5, and the slider 14 is made to slide into the chamber 13 so as to be completely inserted into the casing 12 and is, therefore, decoupled by the valve element 4.

In this latest condition the balancing shaft of the balancing machine can be made to rotate, while the locking device is maintained in an active condition thus without being connected to the stationary distributor 5.

In this way, the source of dynamic vibrations and the danger of wear due to the rotation of the balancing shaft 3 are thus eliminated.

When the balancing operations have been completed, the balancing shaft can be stopped.

Afterwards compressed air is again introduced, but only through the third fluid inlet 312 of the stationary distributor 5.

Through the third fluid inlet 312 the compressed air flows into the seat 18, in which it expands thereby acting on the stem element 17 so as to make the stem element 17 to axially slide into the slider 14 toward the valve element 4.

The stem element 17 slides until its end portion protrudes from the slider 14 and abuts against the closing element 7.

Under the action of the stem element 17, the closing element 7 moves again backward into the body 6, thus reopening the opening 106, through which the compressed air escape from the axial channel 201 in which it was previously introduced. The escaping of the compressed air from the axial channel 201 causes the deactivation of the locking device, which can be therefore removed from the balancing shaft.

In the second embodiment of the snap coupling apparatus 1', the overall functioning is essentially analogous to that of the first embodiment.

The second embodiment essentially differs by the first one in regard to the deactivation phase, which is no longer performed by the stem element 17, but by the deactivation element 2' and in particular by the wedge-shaped element 24' thereof. The wedge-shaped element 24' acts on the stem element 7', going, under the action of the actuator 23', into contact with the stem element 7' and pushing it to return into the body 6' of the valve element 4'.

The action of the deactivation element 2' is alternated with respect to that of the slider 14' of the stationary distributor 5'. In this way, the opening 106' is no longer regulated by a closing element 7, but by a stem element 7' having an enlarged head 107', which is provided, on the side toward the body 6 of the slider 14'.

Between the enlarged head 107' and the collar 10' are interposed seal means 11' to adhere to the stem element 7' so as to seal the valve element 4' during the activated phase of the device.

The invention claimed is:

1. Apparatus comprising a normally closed valve element that can be mounted on a mobile part and fluid distributor means that can be mounted on a stationary part and is operatively connectable with said valve element, said valve element comprising;
    a bell-body provided with a bottom part and an opening which can be closed with a closing element,
    elastic means interposed between said closing element and said bottom part, said elastic means being suitable for maintaining said closing element in a configuration in which said opening is closed,
    a pipe passing through said bottom part of said body for connecting said body to a fluid-dynamic device,
    collar means radially protruding from the inner part of said opening and suitable for being in contact with and limiting said closing element, and
    seal means interposed between said closing element and said collar,
and wherein the distributor means comprises:
    a container sealing body provided with at least three fluid inlets placed in order,
    a chamber axially provided inside said container sealing body,
    a slider that is arranged for axially sliding in said chamber and that is moved by first drive and return means, and that is provided with a front outlet, and
    a stem element slidable mounted in a corresponding seat provided in said slider, which is moved by second drive and return means, so as to partially protrude from said slider through said opening.

2. Apparatus according to claim 1, wherein said slider is provided with at least a transversal inlet which can be alternatively coupled and uncoupled with one of the three fluid inlets and which can be connected through a pipe section obtained in the slider to said front outlet.

3. Apparatus according to claim 2, wherein said transversal inlet is configured as an annular groove.

4. Apparatus according to claim 1, wherein said three fluid inlets comprise a first fluid inlet and a second fluid inlet arranged for allowing the inlet of the fluid used for activating a fluid-dynamic device and a third fluid inlet arranged for allowing the inlet of the fluid used for deactivating a fluid-dynamic device.

5. Apparatus according to claim 4, wherein said first fluid inlet and said second fluid inlet can be supplied essentially simultaneously and said third fluid inlet can be supplied in place of said first fluid inlet and said second fluid inlet.

6. Apparatus according to claim 4, wherein said first fluid inlet can be coupled with said transversal inlet.

7. Apparatus according to claim 1, wherein said front outlet is externally provided with further seal means so arranged as to abutting against said collar.

8. Apparatus according to claim 1, wherein annular seal means are provided between said chamber and said slider and between said seat and said stem element.

* * * * *